(12) United States Patent
Li

(10) Patent No.: US 10,017,640 B2
(45) Date of Patent: Jul. 10, 2018

(54) HALOGEN FREE FLAME RETARDED POLYCARBONATE

(71) Applicant: Bayer MaterialScience LLC, Pittsburgh, PA (US)

(72) Inventor: Xiangyang Li, Seven Fields, PA (US)

(73) Assignee: Covestro LLC, Pittsburgh, PA (US)

( * ) Notice: Subject to any disclaimer, the term of this patent is extended or adjusted under 35 U.S.C. 154(b) by 247 days.

(21) Appl. No.: 13/905,243

(22) Filed: May 30, 2013

(65) Prior Publication Data

US 2014/0256861 A1 Sep. 11, 2014

Related U.S. Application Data

(60) Provisional application No. 61/774,661, filed on Mar. 8, 2013.

(51) Int. Cl.
| | |
|---|---|
| *C08L 69/00* | (2006.01) |
| *C08K 5/523* | (2006.01) |
| *C08K 7/14* | (2006.01) |
| *C08L 51/08* | (2006.01) |

(52) U.S. Cl.
CPC .............. *C08L 69/00* (2013.01); *C08K 5/523* (2013.01); *C08K 7/14* (2013.01); *C08L 51/085* (2013.01)

(58) Field of Classification Search
CPC ........................................................ C08L 69/00
USPC ................................. 523/201; 524/127, 494
See application file for complete search history.

(56) References Cited

U.S. PATENT DOCUMENTS

| | | | |
|---|---|---|---|
| 3,334,154 A | 8/1967 | Kim | |
| 3,382,207 A | 5/1968 | Jaquiss | |
| 3,647,747 A | 3/1972 | Bialous | |
| 3,733,295 A | 5/1973 | Martin | |
| 3,751,400 A | 8/1973 | Crennan et al. | |
| 5,952,408 A * | 9/1999 | Lee et al. ...................... | 524/127 |
| 6,174,944 B1 | 1/2001 | Chiba et al. | |
| 6,448,324 B1 * | 9/2002 | Nodera et al. ................ | 524/451 |
| 6,613,820 B2 * | 9/2003 | Fujiguchi et al. ............ | 524/109 |
| 7,223,804 B2 | 5/2007 | An et al. | |
| 7,259,201 B2 | 8/2007 | Gallucci et al. | |
| 7,709,562 B2 * | 5/2010 | Li et al. ......................... | 524/108 |
| 7,799,855 B2 * | 9/2010 | Ebeling et al. ................ | 524/127 |
| 8,552,096 B2 * | 10/2013 | Li et al. ........................ | 524/127 |
| 2002/0137822 A1 | 9/2002 | Seidel et al. | |
| 2002/0151624 A1 * | 10/2002 | Kobayashi .............. | C08K 3/34 524/115 |
| 2003/0105196 A1 | 6/2003 | Seidel et al. | |
| 2007/0082995 A1 | 4/2007 | Costanzi et al. | |
| 2008/0015291 A1 * | 1/2008 | Siripurapu .............. | C08L 69/00 524/115 |
| 2008/0090961 A1 * | 4/2008 | Li et al. .......................... | 525/63 |
| 2008/0132617 A1 | 6/2008 | Eckel et al. | |
| 2009/0118402 A1 * | 5/2009 | Jang et al. .................... | 524/127 |
| 2009/0143513 A1 * | 6/2009 | Rogunova ..................... | 524/127 |
| 2009/0326111 A1 | 12/2009 | Rogunova | |
| 2010/0152344 A1 | 6/2010 | van den Bogerd et al. | |
| 2011/0027575 A1 | 2/2011 | Drube et al. | |
| 2013/0317149 A1 * | 11/2013 | Zhao et al. ................... | 524/127 |

FOREIGN PATENT DOCUMENTS

| | | |
|---|---|---|
| CA | 2494351 A1 | 2/2004 |
| CN | 102702715 A | 10/2012 |
| EP | 2810990 A1 | 12/2014 |
| JP | 2004043741 A | 2/2004 |
| JP | 2005206698 A | 8/2005 |
| JP | 2008143997 A | 6/2008 |
| WO | 0039210 A1 | 7/2000 |
| WO | 2012033007 A1 | 3/2012 |

OTHER PUBLICATIONS

Karak, Fundamentals of Polymers: Raw Materials to Finished Products, p. 62, 2009 (Year: 2009).*

* cited by examiner

*Primary Examiner* — Christopher M Rodd
(74) *Attorney, Agent, or Firm* — John E. Mrozinski, Jr.; Richard P. Bender

(57) ABSTRACT

The present invention provides a flame-retardant thermoplastic molding composition made from an aromatic polycarbonate, an impact modifier, a bisphenol-A oligophosphate and glass fibers, wherein the ratio of polycarbonate to bisphenol-A oligophosphate is less than about 7.5, wherein the ratio of glass fibers to bisphenol-A oligophosphate is less than about 2.5, wherein the composition is rated V0 at 1.5 mm according to UL-94, and wherein the composition is free from halogenated flame retardants.

4 Claims, No Drawings

HALOGEN FREE FLAME RETARDED POLYCARBONATE

FIELD OF THE INVENTION

The present invention relates in general to, thermoplastic compositions and more specifically to, halogen free, flame-retardant polycarbonate compositions.

BACKGROUND OF THE INVENTION

Since its introduction to the market in 1962, aromatic polycarbonate has become well known and accepted as a thermoplastic resin suitable for a wide variety of uses including injection molding, extrusion and film formation. The chemistry, synthesis, properties and applications of these polycarbonates are extensively discussed in *Chemistry and Physics of Polycarbonates* by Schnell, Interscience, 1964 and *Polycarbonates* by Christopher and Fox, Reinhold, 1962. Although polycarbonates being self-extinguishing have some inherent flame resistance, ever more demanding requirements of flame-resistance have spawned numerous attempts to increase this property. One approach has been to add substantial amounts of halogen, particularly bromine or chlorine, to polycarbonate compositions. The halogen can be carried by polycarbonate polymer chains such as described in U.S. Pat. Nos. 3,751,400 and 3,334,154 or by a monomeric compound as in U.S. Pat. No. 3,382,207. However, the presence of substantial amounts of halogen has been found to be detrimental to the properties of the polycarbonate, and numerous additives such as those found in U.S. Pat. Nos. 3,647,747 and 3,733,295 have been proposed to overcome those detrimental effects.

Flame retardant polycarbonate products are available in which no brominated or chlorinated flame retardant additives are included. However, fluorine containing compounds are included to provide flame retardancy. For example, US Published Patent Application No. 2007/0082995 in the name of Costanzi et al. discloses a thermoplastic halogen-free flame retardant composition containing at least a hypophosphorous acid metal salt as a halogen-free flame retardant agent, and at least an aromatic polycarbonate resin and/or its blends. The flame retardant composition may include additives and fillers, in particular, fluorine-containing ethylene polymers which exhibit a resin melt dropping preventing effect when the composition is fired. The disclosure of Costanzi et al. also refers to molded thermoplastic articles made by using the flame retardant composition.

JP 2008-143997 in the name of Hiromitsu et al. provides a polycarbonate resin composition which are said to be excellent in rigidity, self-tap strength, dimensional stability, flame retardancy, fluidity, and appearance, prepared by compounding 100 pts. wt. polycarbonate resin with 0.1-20 pts. wt. acrylonitrile/styrene copolymer, 0.1-30 pts. wt. polycarbonate olygomer, 10-25 pts. wt. phosphorus-containing flame retardant, 80-160 pts. wt. glass filler of a glass fiber/glass flake weight ratio in the range of 0.2-4.0, and 0.1-2.5 pts. wt. polyfluoroolefin-type polymer (component F). An optical component may be molded from the resin composition of Hiromitsu et al.

Yuichi et al. in JP 2005-206698, discloses a flame-retardant polycarbonate resin composition said to be excellent in wet-heat resistance and excellent in heat stability, processability, transparency, etc., and having flame retardancy improved without using any chlorine- or bromine-containing compound. The polycarbonate composition is prepared by formulating 100 pts. wt. polycarbonate containing 100 to 20 wt. % aromatic polycarbonate resin having a structural viscosity index N of 1.2 or higher with 0.001 to 5 pts. wt. flame retardant represented by formula (B-1) or formula (B-2).

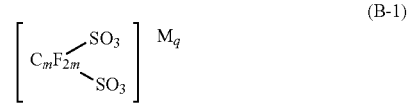

In formula (B-1), m is an integer of 1 to 12; and M is an alkali metal or an alkaline earth metal; q is 2 when M is an alkali metal and is 1 when M is an alkaline earth metal. In formula (B-2), $R_f$ is an optionally substituted perfluoroalkyl group having 2 to 12 carbon atoms in total; M' is an alkali metal or an alkaline earth metal; and n is equal to the valence of M'.

U.S. Pat. No. 7,223,804 issued to An et al. describes a thermoplastic composition containing polycarbonate, an impact modifier having a pH of about 3 to about 7, and a flame retardant essentially free of bromine and chlorine.

Gallucci et al., in U.S. Pat. No. 7,259,201, provides a film, which contains greater than or equal to about 95 wt % thermoplastic resin, based on a total weight of the film, wherein the thermoplastic resin is selected from the group consisting of polyimide, polyetherimide, polyetherimide sulfone, and copolymers, reaction products, and combinations comprising at least one of those thermoplastic resins; and about 0.001 wt % to about 5.0 wt % of a fluoroalkyl sulfonate salt, based on the total weight of the film; wherein the film has a UL-94 rating of VTM-0 and further wherein less than or equal to 2,500 parts per million by weight of bromine is present.

JP 2004-043741 in the name of Manabu et al. describes a resin composition said to have high rigidity and flame retardancy, sufficient heat-resistance, excellent flowability and low mold-staining property which is made from (G) 60-97 mass % flame-retardant resin composition produced by compounding (D) 100 pts. mass of a resin composition composed of (A) 5-60 mass % graft copolymer produced by the graft polymerization of a monomer containing an aromatic alkenyl compound monomer (a) and/or a vinyl cyanide compound monomer (b) to a rubbery polymer (r), (B) 0-45 mass % polymer containing the monomer unit (a) and/or the monomer unit (b) and (C) 40-95 mass % polycarbonate resin with (E) 1-30 pts. mass of a phosphate-based flame-retardant and (F) 0.3-10 pts. mass of a red-phosphorus flame retardant and (H) 3-40 mass % fibrous filler.

Chiba et al., in U.S. Pat. No. 6,174,944, discloses a flame retardant polycarbonate resin composition and housings of the composition for electric and electronic instruments and appliances. The composition is said to have good fluidity and good moldability, can be molded into thin-wall moldings with good appearance. The composition of Chiba et al. contains additive components of a fibrous filler, a terpene resin, a composite rubber-based graft copolymer, a halogen-free phosphate compound and a polytetrafluoroethylene.

Therefore, a need continues to exist in the art for a polycarbonate with improved flame retardancy which do not include a halogenated flame retardant in the formulation.

SUMMARY OF THE INVENTION

Accordingly, the present invention provides such a thermoplastic molding composition which contains no brominated, chlorinated or fluorinated flame retardant additives. In accordance with UL-94 standard, the thermoplastic molding composition of the present invention is rated V-0 at 1.5 mm.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages, so forth in the specification are to be understood as being modified in all instances by the term "about."

The present invention provides a flame-retardant thermoplastic molding composition made from an aromatic polycarbonate, an impact modifier, a bisphenol-A diphosphate and glass fibers, wherein the ratio of polycarbonate to bisphenol-A diphosphate is less than about 7.5, wherein the ratio of glass fibers to bisphenol-A diphosphate is less than about 2.5, wherein the composition is rated V0 at 1.5 mm according to UL-94, and wherein the composition is free from halogenated flame retardants.

Aromatic Polycarbonate

The term aromatic polycarbonates as used in the present context, refers generically to homopolycarbonates, and to copolycarbonates, including polyestercarbonates. These materials are well known and are available in commerce. Aromatic polycarbonates may be prepared by known processes including melt transesterification process and interfacial polycondensation process (See, e.g., Schnell's "Chemistry and Physics of Polycarbonates", Interscience Publishers, 1964) and are widely available in commerce, for instance under the MAKROLON name from Bayer MaterialScience.

Aromatic dihydroxy compounds suitable for the preparation of aromatic polycarbonates conform to formula (I):

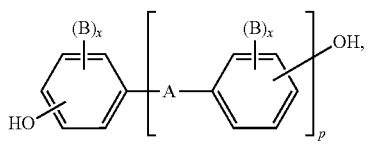

(I)

wherein
A represents a single bond, $C_1$- to $C_5$-alkylene, $C_2$- to $C_5$-alkylidene, $C_5$- to $C_6$-cycloalkylidene, —O—, —SO—, —CO—, —S—, —SO_2—, $C_6$- to $C_{12}$-arylene, to which there may be condensed other aromatic rings optionally containing hetero atoms, or a radical conforming to formula (II) or (III):

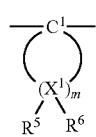

(II)

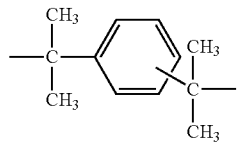

(III)

The substituents B independently denote $C_1$- to $C_{12}$-alkyl, preferably methyl, x independently denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl)-sulfones and α,α-bis-(hydroxyphenyl)-diisopropylbenzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxy-phenyl)-propane (bisphenol A). These compounds may be used singly or as mixtures containing two or more aromatic dihydroxy compounds.

Chain terminators suitable for the preparation of polycarbonates include phenol, p-chlorophenol, p-tert.-butylphenol, as well as long-chained alkylphenols, such as 4-(1,3-tetramethylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is preferably 0.5 to 10% based on the total molar amount of the aromatic dihydroxy compounds used.

Polycarbonates may be branched in a known manner, preferably by the incorporation of 0.05 to 2.0%, based on the molar amount of the aromatic dihydroxy compounds used, of compounds having a functionality of three or more, for example compounds having three or more phenolic groups. Branched polycarbonates may be prepared by a variety of processes such as those described in U.S. Pat. Nos. 4,185,009, 5,367,044, 4,174,437, 5,001,177, 6,307,006 and 7,345,133, the entire contents of which are incorporated by reference.

Aromatic polyestercarbonates are known. Suitable such resins are disclosed in U.S. Pat. Nos. 4,334,053: 6,566,428 incorporated herein by reference and in CA1173998.

Aromatic dicarboxylic acid dihalides for the preparation of aromatic polyester carbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1. Branching agents may also be used in the preparation of suitable polyestercarbonates, for example, carboxylic acid chlorides having a functionality of three or more, such as trimesic acid trichloride, cyanuric acid trichloride, 3,3'-4,4'-benzophenone-tetracarboxylic acid tetrachloride, 1,4,5, 8-naphthalenetetracarboxylic acid tetrachloride or pyromellitic acid tetrachloride, in amounts of 0.01 to 1.0 mol.% (based on dicarboxylic acid dichlorides used), or phenols having a functionality of three or more, such as phloroglucinol, 4,6-dimethyl-2,4,6-tri-(4-hydroxyphenyl)-heptene-2, 4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxy-triphenyl)-methyl]-benzene, in amounts of from 0.01 to 1.0 mol.%, based on diphenols used. Phenolic branching agents can be placed in the reaction vessel with the diphenols, acid chloride branching agents may be introduced together with the acid dichlorides.

The content of carbonate structural units in the polyestercarbonates may preferably be up to 99 mol.%, more preferably up to 80 mol.%, most preferably up to 50 mol.%, based on the sum of ester groups and carbonate groups. Both the esters and the carbonates contained in the polyestercarbonates may be present in the polycondensation product in the form of blocks or in a randomly distributed manner.

The preferred aromatic polycarbonates have weight-average molecular weights (measured by gel permeation chromatography) of at least 25,000, more preferably at least 26,000. Preferably, these have maximum weight-average molecular weight of 80,000, more preferably up to 70,000, most preferably up to 50,000 g/mol.

Bisphenol-A Oligophosphate

Bisphenol A-based oligophosphates according to formula (IV)

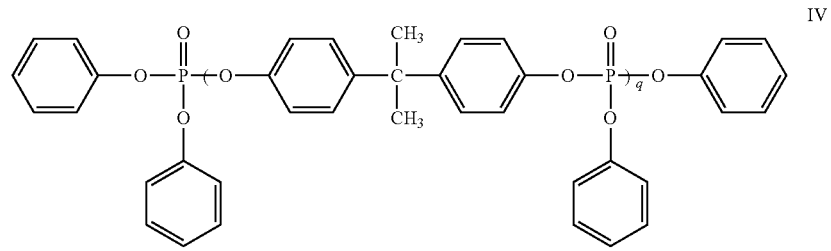

IV wherein q in formula (IV) represents values from 1.05 to 1.2.

The bisphenol-A oligophosphate which is particularly preferred in the present invention (which is also termed bisphenol A-bis-diphenyl phosphate or tetraphenyl-bisphenol A diphosphate; BDP) is commercially available as FYROFLEX BDP (from Akzo Nobel Chemicals BV), NCENDX P-30 (from Albemarle), REOFOS BAPP (from Great Lakes) and CR 741 (from Daihachi).

Impact Modifier

The graft (co)polymer suitable in the context of the invention has a core/shell structure and may preferably be obtained by graft polymerizing alkyl(meth)acrylate and optionally a copolymerizable vinyl monomer onto a composite rubber core. The composite rubber core that includes interpenetrated and inseparable interpenetrating network (IPN) type polymer is characterized by having a glass transition temperature preferably below 0° C., more preferably below −20° C., most preferably below −40° C.

The preferred core is a polysiloxane-alkyl(meth)acrylate interpenetrating network (IPN) type polymer that contains polysiloxane and butylacrylate. The shell is a rigid phase, preferably polymerized of methylmethacrylate. The weight ratio of polysiloxane/alkyl(meth)acrylate/rigid shell is 5-90/10-95/5-60.

The rubber core has median particle size ($d_{50}$ value) of preferably 0.05 to 5 micron, more preferably 0.1 to 2 microns, most preferably 0.1 to 1 micron. The median value may be determined by ultracentrifuge measurement (W. Scholtan, H. Lange, Kolloid, Z. und Z. Polymere 250 (1972), 782-1796).

The polyorganosiloxane component in the silicone acrylate composite rubber may be prepared by reacting an organosiloxane and a multifunctional crosslinking agent in an emulsion polymerization process. It is also possible to insert graft-active sites into the rubber by addition of suitable unsaturated organosiloxanes.

The organosiloxane may preferably be cyclic with the ring structures preferably containing from 3 to 6 Si atoms. Examples include hexamethylcyclotrisiloxane, octamethylcyclotetrasiloxane, decamethylcyclopenta-siloxane, dodecamethylcyclohexasiloxane, trimethyltriphenylcyclotrisiloxane, tetramethyltetraphenylcyclotetrasiloxane, octaphenylcyclotetrasiloxane, which may be used alone or in a mixture of 2 or more such compounds. The organosiloxane component is preferably present in the silicone acrylate rubber in an amount of at least 5%, more preferably at least 10%, based on weight of the silicone acrylate rubber.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxysilane, tetrabutoxysilane.

Graft-active sites may be included into the polyorganosiloxane component of the silicone acrylate rubber by incorporating a compound conforming to any of the following structures:

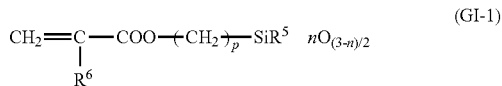

(GI-1)

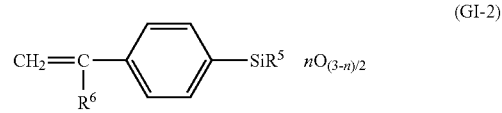

(GI-2)

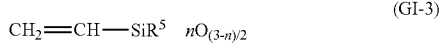

wherein
$R^5$ denotes methyl, ethyl, propyl or phenyl,
$R^6$ denotes hydrogen or methyl,
n denotes 0, 1 or 2, and
p denotes 1 to 6.

(Meth)acryloyloxysilane is a preferred compound for forming the structure (GI-1). Preferred (meth)acryloyloxysilanes include β-methacryloyloxyethyl-dimethoxy-methyl-silane, γ-methacryloyl-oxy-propylmethoxy-dimethyl-silane, γ-methacryloyloxypropyl-dimethoxy-methyl-silane, γ-methacryloyloxypropyl-tri-methoxy-silane, γ-methacryloyloxy-propyl-ethoxy-diethyl-silane, γ-methacryloyl-oxy-propyl-diethoxy-methyl-silane, γ-methacryloyloxy-butyl-diethoxy-methyl-silane.

Vinylsiloxanes, especially tetramethyl-tetravinyl-cyclotetrasiloxane, are suitable for forming the structure GI-2.

p-Vinylphenyl-dimethoxy-methylsilane, for example, is suitable for forming structure GI-3. γ-Mercaptopropyldimethoxy-methylsilane, γ-mercaptopropylmethoxy-dimethylsilane, γ-mercaptopropyl-diethoxymethylsilane, etc. are suitable for forming structure (GI-4).

The amount of these compounds is preferably up to 10%, more preferably 0.5 to 5.0% (based on the weight of polyorganosiloxane).

The acrylate component in the silicone acrylate composite rubber may be prepared from alkyl (meth)acrylates, crosslinkers and graft-active monomer units.

Examples of preferred alkyl (meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate. N-butyl acrylate is particularly preferred.

Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate.

The following compounds individually or in mixtures may be used for inserting graft-active sites: allyl methacrylate, triallyl cyanurate, triallyl isocyanurate, allyl methacrylate. Allyl methacrylate may also act as a crosslinking agent. These compounds may preferably be used in amounts of 0.1 to 20%, based on the weight of acrylate rubber component.

Methods of producing the silicone acrylate composite rubbers which are preferably used in the compositions according to the invention, and their grafting with monomers, are described, for example, in U.S. Pat. Nos. 4,888,388 and 4,963,619 both of which are incorporated herein by reference.

The graft polymerization onto the graft base (herein C.1) may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates.

The graft shell (C.2) may be formed of a mixture of
C.2.1: preferably 0 to 80%, more preferably 0 to 50%, most preferably 0 to 25% (based on the weight of the graft shell), of vinyl aromatic compounds or ring-substituted vinyl aromatic compounds (e.g. styrene, α-methylstyrene, p-methylstyrene), vinyl cyanides (e.g. acrylonitrile and methacrylonitrile), and
C.2.2: preferably 100 to 20%, more preferably 100 to 50%, most preferably 100 to 75% (based on the weight of the graft shell) of at least one monomer selected from the group consisting of (meth)acrylic acid ($C_1$-$C_8$)-alkyl esters (e.g. methyl methacrylate, n-butyl acrylate, tert.-butyl acrylate) and derivatives (e.g. anhydrides and imides) of unsaturated carboxylic acids (e.g. maleic anhydride and N-phenyl maleimide).

The preferred graft shell includes one or more (meth) acrylic acid ($C_1$-$C_8$)-alkyl esters, especially methyl methacrylate.

Other Components

The inventive composition may further include additives that are known for their function in the context of thermoplastic molding compositions that contain poly(ester)carbonates. These include any one or more of lubricants, mold release agents, for example pentaerythritol tetrastearate, nucleating agents, antistatic agents, thermal stabilizers, light stabilizers, hydrolytical stabilizers, fillers and reinforcing agents, colorants or pigments, as well as further flame retarding agents or a flame retarding synergists.

The inventive compositions may be prepared conventionally using conventional equipment and following conventional procedures. The inventive composition may be used to produce moldings of any kind by thermoplastic processes such as injection molding, extrusion and blow molding methods.

EXAMPLES

The present invention is further illustrated, but is not to be limited, by the following examples. All quantities given in "parts" and "percents" are understood to be by weight, unless otherwise indicated. The following components were used in preparing the compositions of the Examples:

| | |
|---|---|
| PC | a bisphenol-A based on branched homopolycarbonate having melt flow rate of about 2.5 g/10 min (at 300° C., 1.2 kg) per ASTM D 1238 (Makrolon WB1239, a product of Bayer MaterialScience LLC); |
| Graft Copolymer | poly(organosiloxane/acrylate) based composite rubber graft copolymer, the core is composite rubber comprised of polysiloxane (siloxane) and polybutyl acrylate (BA) and the shell is comprised of polymethyl methacrylate (MMA), with a weight ratio of siloxane/BA/MMA of about 10/80/10; |
| BDPO | bisphenol-A oligophosphate (bisphenol A-bis-diphenyl phosphate) commercially available as NCENDX P-30 from Albemarle; and |
| Glass fibers | commercially available as 415A-17C from Owens-Corning. |

Examples 1-8

The components were combined in the amounts given below in Table I and Table II. Multi-axial impact was measured by ASTM D 3763. The UL 94 vertical burning test was done according to UL94 procedure after the specimens had been conditioned for two days at 23° C. The MVR (melt volume rate) was measured according to ASTM D 1238 at 300° C. and 1.2 kg load.

TABLE I

|  | Ex. C1 | Ex. C2 | Ex. 3 | Ex. 4 | Ex. 5 | Ex. 6 | Ex. 7 |
|---|---|---|---|---|---|---|---|
| Graft copolymer | 7.5 | 7.5 | 7.5 | 7.5 | 7.5 | 7.5 | 7.5 |
| BDPO | 10 | 9.17 | 14 | 12 | 12 | 12 | 14.83 |
| Glass fibers | 7 | 11 | 7 | 16.66 | 5.34 | 11 | 11 |
| PC | 75.5 | 72.33 | 71.5 | 63.84 | 75.16 | 69.5 | 66.67 |
| PC/BDPO | 7.6 | 7.9 | 5.1 | 5.3 | 6.3 | 5.8 | 4.5 |
| Glass fiber/BDPO | 0.7 | 1.2 | 0.5 | 1.4 | 0.4 | 0.9 | 0.7 |
| MVR (cm$^3$/10 min) | 4.4 | 3.6 | 7.1 | 4.1 | 6.0 | 4.8 | 6.6 |
| Multi-axial impact total energy 23 C. (ft-lbf) | 9.9 | 8.2 | 8.8 | 3.9 | 11.1 | 6.9 | 5.5 |
| Multi-axial energy at peak 23° C. (ft-lbf) | 9.3 | 7.6 | 8.2 | 3.5 | 10.3 | 6.3 | 5.1 |
| UL94 time to flame out after 1st ignition (sec.) | 4.8 | 6.6 | 1 | 1.2 | 2 | 2.6 | 1.4 |
| UL94 time to flame out after 2nd ignition (sec.) | 6.6 | 7.6 | 2.4 | 2.8 | 4.4 | 3 | 2 |
| total burn time (sec.) | 11.4 | 14.2 | 3.4 | 4 | 6.4 | 5.6 | 3.4 |
| UL94-V, 1.5 mm thickness | V1 | V1 | V0 | V0 | V0 | V0 | V0 |

As is apparent by reference to Table I, those compositions (Ex. 3 to 7) having polycarbonate to bisphenol-A oligophosphate ratio of less than 7.5 exhibit a V0 rating at 1.5 mm; but those compositions (Ex. C1 and C2) having polycarbonate to bisphenol-A oligophosphate ratio of more than 7.5 exhibit a V1 rating at 1.5 mm thickness.

TABLE II

|  | Ex. C8 | Ex. 9 | Ex. 10 | Ex. 11 |
|---|---|---|---|---|
| Graft copolymer | 7.5 | 7.5 | 7.5 | 7.5 |
| BDPO | 10 | 14 | 10 | 14 |
| Glass fibers | 25 | 15 | 15 | 25 |
| PC | 57.5 | 63.5 | 67.5 | 53.5 |
| PC/BDPO | 5.8 | 4.5 | 6.8 | 3.8 |
| Glass fiber/BDPO | 2.5 | 1.1 | 1.5 | 1.8 |
| MVR (cm$^3$/10 min) | 2.4 | 5.2 | 3.4 | 3.6 |
| Multi-axial impact total energy 23C (ft-lbf) | 2.4 | 3.6 | 4.8 | 2.0 |
| Multi-axial energy at peak 23° C. (ft-lbf) | 1.1 | 3.3 | 4.2 | 1.0 |
| UL94 time to flame out after 1st ignition (second) | 3.6 | 1.8 | 4 | 1.4 |
| UL94 time to flame out after 2nd ignition (second) | 6.2 | 3.6 | 3.6 | 4 |
| total burn time (second) | 9.8 | 5.4 | 7.6 | 5.4 |
| UL 94-V, 1.5 mm thickness | V2 | V0 | V0 | V0 |

As shown in Table II, those compositions (Ex. 9 to 11) having ratio of glass fibers to bisphenol-A oligophosphate of less than 2.5 and having polycarbonate to bisphenol-A oligophosphate ratio of less than 7.5 exhibit a V0 rating at 1.5 mm; but the composition (Ex. C8) having ratio of glass fibers to bisphenol-A oligophosphate of more than 2.5 exhibit a V2 rating at 1.5 mm thickness.

Such thermoplastic molding compositions are suitable for a number of applications where a halogenated flame retardant is not desired, such as furniture raceways where more sustainable and more environmentally friendly materials are desired.

The foregoing examples of the present invention are offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A flame-retardant thermoplastic molding composition comprising:
A) an aromatic polycarbonate;
B) a core-shell copolymer comprising a poly(organosiloxane/acrylate) based composite rubber graft copolymer, wherein the core comprises composite rubber comprising polysiloxane (siloxane) and polybutyl acrylate (BA) and wherein the shell comprises polymethyl methacrylate (MMA), having a weight ratio of siloxane/BA/MMA of about 10/80/10;
C) a bisphenol-A oligophosphate; and
D) glass fibers;
wherein the aromatic polycarbonate content is between 50 to 85 pbw (parts by weight), the impact modifier content is between 2 to 15 pbw, the bisphenol-A oligophophate content is between 5 to 25 pbw, and the glass fiber content is between 3 to 45 pbw, wherein the ratio of polycarbonate to bisphenol-A oligophosphate is less than about 7.5, wherein the ratio of glass fibers to bisphenol-A oligophosphate is less than about 2.5, wherein the composition is rated V0 at 1.5 mm according to UL-94, and wherein the composition is halogen free.

2. The flame-retardant thermoplastic molding composition according to claim 1, wherein the bisphenol-A oligophosphate is bisphenol A-bis-diphenyl phosphate.

3. The flame-retardant thermoplastic molding composition according to claim 1, wherein the aromatic carbonate is a branched polycarbonate having 0.05 to 2.0%, based on the molar amount of the aromatic dihydroxy compounds used, of compounds having a functionality of three or more.

4. The flame-retardant thermoplastic molding composition according to claim 1 further comprising one or more additives selected from the group consisting of lubricants, mold release agents, nucleating agents, antistatic agents, thermal stabilizers, light stabilizers, hydrolytical stabilizers, fillers, reinforcing agents, colorants, pigments, flame retarding agents and flame retarding synergists.

* * * * *

UNITED STATES PATENT AND TRADEMARK OFFICE
CERTIFICATE OF CORRECTION

PATENT NO. : 10,017,640 B2
APPLICATION NO. : 13/905243
DATED : July 10, 2018
INVENTOR(S) : Li Page 1 of 1

It is certified that error appears in the above-identified patent and that said Letters Patent is hereby corrected as shown below:

On the Title Page

At Item (54), and in the Specification, Column 1 Line 1 delete the title:
"HALOGEN FREE FLAME RETARDED POLYCARBONATE"
And insert therefor:
--HALOGEN FREE FLAME RETARDANT POLYCARBONATE--

Signed and Sealed this
Twenty-first Day of August, 2018

Andrei Iancu
*Director of the United States Patent and Trademark Office*